United States Patent
Braun et al.

(10) Patent No.: US 10,227,473 B2
(45) Date of Patent: *Mar. 12, 2019

(54) PROPYLENE COPOLYMER COMPOSITION WITH IMPROVED LONG-TERM MECHANICAL PROPERTIES

(71) Applicant: BOREALIS AG, Vienna (AT)

(72) Inventors: Juliane Braun, Linz (AT); Luca Boragno, Pichling (AT); Jingbo Wang, Linz (AT); Pauli Leskinen, Helsinki (FI); Johanna Lilja, Porvoo (FI); Markus Gahleitner, Neuhofen/Krems (AT)

(73) Assignee: BOREALIS AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/552,191

(22) PCT Filed: Feb. 23, 2016

(86) PCT No.: PCT/EP2016/053698
§ 371 (c)(1),
(2) Date: Aug. 18, 2017

(87) PCT Pub. No.: WO2016/135108
PCT Pub. Date: Sep. 1, 2016

(65) Prior Publication Data
US 2018/0037716 A1    Feb. 8, 2018

(30) Foreign Application Priority Data
Feb. 25, 2015    (EP) .................................... 15156439

(51) Int. Cl.
| | | |
|---|---|---|
| C08L 23/16 | (2006.01) | |
| C08K 5/00 | (2006.01) | |
| C08L 23/14 | (2006.01) | |
| C08F 210/06 | (2006.01) | |
| C08F 2/00 | (2006.01) | |
| C08F 4/6192 | (2006.01) | |

(52) U.S. Cl.
CPC .......... *C08K 5/0083* (2013.01); *C08F 210/06* (2013.01); *C08L 23/14* (2013.01); *C08F 2/001* (2013.01); *C08F 4/61922* (2013.01); *C08F 2500/12* (2013.01); *C08L 23/16* (2013.01); *C08L 2205/025* (2013.01); *C08L 2205/24* (2013.01)

(58) Field of Classification Search
CPC .................................................. C08F 210/16
See application file for complete search history.

(56) References Cited

U.S. PATENT DOCUMENTS

2013/0303684 A1* 11/2013 Gloger .................. C08F 110/06
524/570

FOREIGN PATENT DOCUMENTS

| | | | |
|---|---|---|---|
| CN | 1285851 A | 2/2001 | |
| CN | 1675298 A | 9/2005 | |
| CN | 102821928 A | 12/2012 | |
| EP | 0887379 B1 | 12/2004 | |
| EP | 2013282 A1 | 1/2009 | |
| EP | 2 371 517 A1 * | 10/2011 | ............ B29C 47/48 |
| EP | 2371517 A1 | 10/2011 | |
| WO | 9212182 A1 | 7/1992 | |
| WO | 9924478 A1 | 5/1999 | |
| WO | 9924479 A1 | 5/1999 | |
| WO | 0068315 A1 | 11/2000 | |
| WO | 2004000899 A1 | 12/2003 | |
| WO | 2004111095 A1 | 12/2004 | |

OTHER PUBLICATIONS

Busico, Vincenzo, et al., "Alk-1-ene Polymerization in the Presence of a Monocyclopentadienyl Zirconiu, m(IV) Acetamidinate Catalyst: Microstructural and Mechanistic Insights", Macromol. Rapid Commun. 2007, 28, 1128-1134.
Challa, G., et al. "On the Determination of the Crystalline Fraction in Isotactic Polystyrene from X-Ray Diffraction", Eingegangen am, Jun. 15, 1962.
Cheng, H.N., "13C NMR Analysis of Ethylene-Propylene Rubbers" Macromolecules 1984, 17, 1950-1955.
Kagugo, Masahiro, et al., "13C NMR Determination of Monomer Sequence Distribution in Ethylene-Propylene Copolymers Prepared with δ-TiCl3-Al(C2H5)2CL" Macromolecules 1982, 15, 1150-1152.
Pae, K.D., et al., "γ-α Solid-Solid Transition of Isotactic Polypropylene", Journal of Polymer Science: Part A-2, vol. 6, 657-663, 1968.
Resconi, Luigi, et al., "Selectivity in Propene Polymerization with Metallocene Catalysts". Chem. Rev., 2000, 100, 1253-1345.
Singh, Gurmeet, et al., "Triad Sequence Determination of Ethylene-Propylene Copolymers—Application of Quantitative 13C NMR", Polymer Testing 28 (2009) 475-479.
Turner-Jones, A., et al., "Crystalline Forms of Isotactic Polypropylene", Eingegangen am, Oct. 8, 1963.
Wang, Wen-Jun, et al., "Structural Analysis of Ethylene/Propylene Copolymers Synthesized with a Constrained Geometry Catalyst", Macromolecules 2000, 33, 1157-1162.
Zhou, Zhe, et al., "A new decoupling method for accurate quantification of polyethylene copolymer composition and triad sequence distribution with 13C NMR", Journal of Magnetic Resonance 187 (2007) 225-233.
International Preliminary Report on Patentability dated Feb. 3, 2017.
Office action for Chinese Patent Application No. 201680011177.9.

* cited by examiner

*Primary Examiner* — Rip A Lee
(74) *Attorney, Agent, or Firm* — Tarolli, Sundheim, Covell & Tummino LLP

(57) ABSTRACT

Propylene-ethylene random copolymers with improved long-term mechanical properties, especially improved impact strength retention, their manufacture as well as their use, e.g. for the production of moulded articles, particularly injection moulded articles, such as thin-walled plastic containers for packaging.

13 Claims, No Drawings

PROPYLENE COPOLYMER COMPOSITION WITH IMPROVED LONG-TERM MECHANICAL PROPERTIES

The present invention relates to new propylene-ethylene random copolymers with improved long-term mechanical properties, especially improved impact strength retention, to their manufacture as well as their use, e.g. for the production of moulded articles, particularly injection moulded articles, such as thin-walled plastic containers for packaging.

Polypropylene derives its mechanical and optical performance from the amount and nature of crystalline phases being present in the final product. Apart from designing the polymer itself, like selecting the average molecular weight, the molecular weight distribution, the type and relative amount of comonomer(s) and the comonomer distribution, the crystalline phase will also be influenced by the presence of crystal nucleating agents. It is well known that different types of crystal nucleating agents will affect the crystal structure of the polymer differently, enhancing the presence and relative amounts of specific crystal modifications of polypropylene, like the monoclinic α-modification, the hexagonal β-modification and the orthorhombic γ-modification. While the polymer structure will affect the degree of expression of a specific nucleation, the type of crystal formed will be determined by the nucleating agent.

A class of polypropylenes especially requiring modification by nucleating agents comprises polypropylene random copolymers being characterized by a homogeneous structure without phase separation and by a low to moderate comonomer content. Commonly used comonomers for said random copolymers are ethylene and/or higher α-olefins with 4 to 8 carbon atoms. Such random copolymers will exhibit a decrease of the spherulitic growth speed and a reduced overall crystallinity upon processing, resulting in better optical properties but at the same time reduced mechanical strength and impaired long-term stability.

Additionally it has to be taken into consideration that the application properties and the lifespan of polymers are decisively influenced by property changes after conversion into the final shape. In case of polypropylene, a semicrystalline polymer that is mostly applied above its glass transition temperature, a combination of physical aging and post-crystallization occurs.

Physical ageing is a very important process characteristic of all glassy materials. Final products of glassy polymers are made by shaping them in the molten state, followed by rapid cooling to below the glass-transition temperature. During the cooling the material solidifies and stiffens, but this process can't to be completed, because the period time is too short: the molecular motions become too sluggish and freeze. Solidification and stiffening continue very slowly during the life of the product: thus many material properties change with time.

In particular, the modulus and toughness undergo steady changes even after long times.

The temperature level of the ageing process plays a decisive role in determining the effects. Apart from that, the nature of the polymer and the type and conditions of conversion are also important. The cumulative effects of crystallization behavior of the polymer and cooling history determine the crystallinity and superstructure of the formed article, which in turn determines the ageing behavior.

The phenomenon of ageing and annealing processes for homo- and copolymers has for example been analysed and described by Gahleitner et al. (J. Macromol. Sci.-Phys., B41 (2002) 833-49). Storage of a polypropylene random copolymer at standard conditions (+23±1° C., 50% relative humidity) has been found to result in increased modulus and reduced toughness over a period of more than 5000 h in case of injection-moulded specimens (Figure 1 of said paper) and over a period of more than 500 h in case of cast films (Figure 9 of said paper).

It is therefore an object of the present invention to provide propylene-ethylene random copolymers which have improved long-term mechanical properties, especially improved impact strength retention, thus avoiding the negative influence of physical ageing and post-crystallization The finding of the present invention is to provide propylene-ethylene random copolymers which are in-reactor nucleated with a polymeric alpha-nucleating agent and have a special polymer design.

Accordingly the present invention is directed to propylene-ethylene random copolymers having
(i) a melt flow rate $MFR_2$ (according to ISO 1133, 230° C., 2.16 kg) in the range of 50 to 120 g/10 min,
(ii) a total ethylene comonomer content of 3.0 to 9.0 mol %
(iii) a content of the orthorhombic gamma-crystal phase 100·Kγ of 20% to less than 45% as determined by wide-angle X-ray diffraction (WAXS) on a 60×60×2 mm³ injection moulded test specimens as described in the experimental part
and comprising
0.0001 to 1.0 wt %, based on the total weight of the propylene-ethylene random copolymer, of a polymeric α-nucleating agent (pNA).

The propylene-ethylene random copolymers as defined above are furthermore characterized by comprising two propylene copolymer fractions
b) a first propylene copolymer fraction (PP-COPO-1) having an ethylene comonomer content of at most 3.5 mol %, and
c) a second propylene copolymer fraction (PP-COPO-2), said first propylene copolymer fraction (PP-COPO-1) having a higher $MFR_2$ and/or a lower ethylene comonomer content than said second propylene copolymer fraction (PP-COPO-2).

In another aspect of the present invention, the propylene-ethylene random copolymers have been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is preferably a non-phthalic compound, more preferably a non-phthalic acid ester; b) optionally a co-catalyst (Co), and c) optionally an external donor (ED). It is most preferred that a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate; b) the molar ratio of co-catalyst (Co) to external donor (ED) [Co/ED] is 5 to 45.

In yet another embodiment of the present invention, the propylene-ethylene random copolymers are produced in at least one reactor (R1) or in a sequential polymerization process comprising at least two reactors (R1) and (R2), whereby in the first reactor (R1) the propylene copolymer fraction (PP-COPO-1) is produced, which is subsequently transferred into the second reactor (R2), and wherein in the second reactor (R2) the second propylene copolymer fraction (PP-COPO-2) is produced in the presence of the first propylene copolymer fraction (PP-COPO-1).

The propylene-ethylene random copolymers as defined above are highly suitable for the use in the production of moulded articles, particularly injection moulded articles, such as thin-walled plastic containers for packaging, which is a further aspect of the present invention.

Moulded articles, especially injection moulded articles prepared form the propylene-ethylene random copolymers of the present invention are characterized by a high tensile modulus (measured according to ISO 527) measured after 96 hours of storage at +23±1° C. and 50% relative humidity (=standard conditions) and even higher high tensile modulus (measured according to ISO 527) measured after 1440 hours of storage under standard conditions.

Simultaneously the puncture energy (measured according to ISO 6603-2; 60×60×2 mm$^3$ specimens) is at a high level measured after 96 hours of storage at +23±1° C. and 50% relative humidity (=standard conditions) and stays approximately on that level when measured after 1440 hours of storage under standard conditions.

As Comparative Examples show this effect is really surprisingly.

In the following the invention is described in more detail.

The propylene-ethylene copolymers according to this invention have a melt flow rate MFR$_2$ (230° C.) measured according to ISO 1133 in the range of 50.0 to 120.0 g/10 min, preferably in the range of 55.0 to 110.0 g/10 min and more preferably in the range of 60.0 to 100.0 g/10 min.

It is appreciated that the propylene-ethylene copolymers preferably have an ethylene comonomer content in a very specific range. Thus it is required that the ethylene comonomer content of the propylene-ethylene copolymers is in the range of 3.0 to 9.0 mol %, preferably in the range of 3.5 to 8.5 mol % and more preferably in the range of 4.0 to 8.0 mol %.

Furthermore the propylene-ethylene copolymers according to this invention are characterized by a content of the orthorhombic gamma-crystal phase 100·Kγ of less than 45%, preferably of less than 40%, as determined by wide-angle X-ray scattering (WAXS on injection moulded plaque samples of 60×60×1 mm$^3$).

A lower limit of the content of the orthorhombic gamma-crystal phase 100·Kγ is 20% and more preferably 25%.

Surprisingly the inventors of the present invention have found that a low content of the orthorhombic gamma-crystal phase (i.e. 100·Kγ of less than 45%) decreases post-crystallization processes in the final articles made of the inventive propylene-ethylene copolymers and thus improves the long-term mechanical properties, especially improves the impact strength retention.

Further the propylene-ethylene copolymers are preferably featured by their relative content of isolated to block ethylene sequences (I(E)). The I(E) content [%] is defined by equation (I)

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

Accordingly it is preferred that the propylene-ethylene copolymers have a normalized PEP value (nPEP) in the range 45.0 to 70.0%, more preferably in the range of 50.0 to 70.0%, still more preferably in the range of 55.0 to 70.0%, yet more preferably in the range of 58.0 to 69.0%.

Further the propylene-ethylene copolymers have a main melting temperature, i.e. a melting temperature representing more than 50% of the melting enthalpy, of at least 130° C., more preferably in the range of 133 to 158° C., still more preferably in the range of 134 to 156° C.

Further it is preferred that the propylene-ethylene copolymers have a crystallization temperature of at least 110° C., more preferably in the range of 110 to 130° C., still more preferably in the range of 112 to 128° C., like in the range of 114 to 126° C.

Preferably, the propylene-ethylene copolymers have a xylene cold soluble fraction (XCS) in the range of 4.0 to 25.0 wt %, preferably in the range of 5.0 to 20.0 wt %, more preferably in the range of 6.0 to 15.0 wt %.

Preferably the propylene-ethylene copolymers according to this invention have been produced in the presence of a Ziegler-Natta catalyst, which will be described in detail below.

The propylene-ethylene copolymers preferably comprise at least two polymer fractions, like two or three polymer fraction, all of them being propylene copolymers. Preferably the random propylene-ethylene copolymers comprise at least two different propylene copolymer fractions, like two different propylene copolymer fractions, wherein further the two propylene copolymer fractions preferably differ in the comonomer content.

Even more preferred the propylene-ethylene copolymers comprise, preferably consists of, a first propylene copolymer fraction (PP-COPO-1) and a second propylene copolymer fraction (PP-COPO-2), wherein further the first propylene copolymer fraction (PP-COPO-1) and the second propylene copolymer fraction (PP-COPO-2) differ in the comonomer content and/or in the melt flow rate MFR$_2$ (230° C.). In one embodiment they differ in the comonomer content and in the melt flow rate MFR$_2$ (230° C.).

In still another embodiment the first random propylene copolymer fraction (PP-COPO-1) has a lower ethylene comonomer content but a higher melt flow rate MFR$_2$ (230° C.) than the second random propylene copolymer fraction (PP-COPO-2).

Thus it is preferred that the first random propylene copolymer fraction (PP-COPO-1) has an ethylene comonomer content of at most 3.5 mol % and more preferably of at most 3.0 mol %. Preferably the first random propylene copolymer fraction (PP-COPO-1) has a comonomer content of at least 1.0 mol %, preferably of at least 1.5 mol %.

The second random propylene copolymer fraction (PP-COPO-2) preferably has an ethylene comonomer content higher than that of the first random propylene copolymer fraction (PP-COPO-1).

Thus it is preferred that the second random propylene copolymer fraction (PP-COPO-2) has an ethylene comonomer content in the range of 2.0 mol % to at most 11.0 mol %, preferably in the range of 2.5 mol % to at most 10.0 mol %, more preferably in the range of 3.0 mol % to 9.5 mol %.

Preferably the first random propylene copolymer fraction (PP-COPO-1) has a melt flow rate MFR$_2$ (230° C.) in the range of in the range of 50.0 to 150.0 g/10 min, more preferably in the range 60.0 to 140.0 g/10 min, still more preferably in the range of 70.0 to 130.0 g/10 min.

Preferably the second random propylene copolymer fraction (PP-COPO-2) has a melt flow rate $MFR_2$ (230° C.) in the range of 40.0 to 120.0 g/10 min, more preferably in the range of 50.0 to 110.0 g/10 min, still more preferably in the range of 55.0 to 100.0 g/10 min, whereby the $MFR_2$ of the second random propylene copolymer fraction (PP-COPO-2) is preferably lower than the $MFR_2$ of the first random propylene copolymer fraction (PP-COPO-1).

Preferably the weight ratio between the first propylene copolymer fraction (PP-COPO-1) and the second propylene copolymer fraction (PP-COPO-2) is 30/70 to 70/30, more preferably 40/60 to 60/40, like 43/57 to 57/43.

The propylene-ethylene copolymers as defined above comprise a α-nucleating agent, i.e. a polymeric α-nucleating agent (pNA).

The polymeric α-nucleating agent (pNA) is introduced into the propylene-ethylene copolymer via its production with a modified catalyst, which has been prepolymerized with that polymeric alpha nucleating agent. This technology is known as BNT-technology (Borealis Nucleation Technology).

Preferably the polymeric α-nucleating agent (pNA) is a polymerized vinyl compound of formula (I)

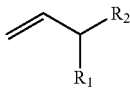

wherein R1 and R2 together form a 5 or 6 membered saturated or unsaturated or aromatic ring or they stand independently for a lower alkyl comprising 1 to 4 carbon atoms.

Preferably the polymeric α-nucleating agent (pNA) is a polymerized vinyl compound selected from the group consisting of vinyl cycloalkanes, in particular vinyl cyclohexane (VCH), vinyl cyclopentane, vinyl-2-methyl cyclohexane and vinyl norbornane, 3-methyl-1butene, 3-ethyl 1-hexene or mixtures thereof. It is especially preferred that the polymeric α-nucleating agent (pNA) is a polymerized a vinyl cycloalkane, especially polymerized vinyl cyclohexane (pVCH).

The polymeric α-nucleating agent (pNA) is present in an amount of 0.0001 to 1.0 wt %, preferably 0.001 wt % to 0.1 wt %, based on the total amount of the propylene-ethylene copolymer.

With regard to the BNT-technology reference is made to the international applications WO 99/24478, WO 99/24479 and particularly WO 00/68315. According to this technology a catalyst system, preferably a Ziegler-Natta procatalyst, is modified by polymerizing the vinyl compound, as described above, in the presence of the catalyst system, comprising a Ziegler-Natta procatalyst, an external donor and a cocatalyst in a prepolymerization step.

The prepolymerization step including BNT-modification will be described in detail below.

The propylene-ethylene copolymers as defined in the instant invention may further contain up to 5.0 wt % additives, like antioxidants, as well as slip agents and antiblocking agents.

Preferably the additive content (without α-nucleating agents) is below 3.0 wt %, like below 1.0 wt %.

The propylene-ethylene copolymers according to this invention are preferably produced in a sequential polymerization process in the presence of a Ziegler-Natta catalyst as defined below.

Accordingly it is preferred that the propylene-ethylene copolymers are produced in the presence of
(a) a Ziegler-Natta catalyst (ZN-C) comprises a titanium compound (TC), a magnesium compound (MC) and an internal donor (ID), wherein said internal donor (ID) is a non-phtalic acid ester,
(b) optionally a co-catalyst (Co), and
(c) optionally an external donor (ED).

Preferably the propylene-ethylene copolymers are produced in a sequential polymerization process comprising at least two reactors (R1) and (R2). In the first reactor (R1) the first propylene copolymer fraction (PP-COPO-1) is produced and subsequently transferred into the second reactor (R2), in the second reactor (R2) the second propylene copolymer fraction (PP-COPO-2) is produced in the presence of the first propylene copolymer fraction (PP-COPO-1).

The term "sequential polymerization system" indicates that the propylene-ethylene copolymers are produced in at least two reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of propylene-ethylene copolymer, i.e. the first fraction of the propylene copolymer (i.e. the first propylene copolymer fraction (PP-COPO-11)), in the polymer slurry within the loop reactor (LR) is typically from 15 wt % to 55 wt %, based on the total weight of the polymer slurry within the loop reactor (LR). In one preferred embodiment of the present invention the average concentration of the first propylene copolymer fraction (PP-COPO-1), in the polymer slurry within the loop reactor (LR) is from 20 wt % to 55 wt % and more preferably from 25 wt % to 52 wt %, based on the total weight of the polymer slurry within the loop reactor (LR).

Preferably the propylene copolymer of the first polymerization reactor (R1), i.e. the first propylene copolymer fraction (PP-COPO-1), more preferably the polymer slurry of the loop reactor (LR) containing the first propylene copolymer fraction (PP-COPO-1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene copolymer fraction (PP-COPO-1), is led directly to the next stage gas phase reactor.

Alternatively, the propylene copolymer of the first polymerization reactor (R1), i.e. the first propylene copolymer fraction (PP-COPO-1), more preferably polymer slurry of the loop reactor (LR) containing the first propylene copolymer fraction (PP-COPO-1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used.

Prior to the slurry reactor (SR) a prepolymerization reactor (PPR) is placed, since the process comprises a prepolymerization step in which the above defined polymeric nucleating agent, preferably the vinyl compound according to formula (I) as defined above, even more preferably vinyl cyclohexane (VCH), is first polymerized in the presence of a catalyst system, comprising a solid Ziegler Natta catalyst component, a cocatalyst and optional external donor, according to the BNT-technology.

The so obtained reaction mixture of the polymer of the vinyl compound according to formula (I) as defined above, even more preferably vinyl cyclohexane (VCH) polymer and the catalyst system is then introduced in the first polymerization reactor (R1).

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i. e. the polymerization is continued until the amount of unreacted vinyl compounds in the reaction mixture (including the polymerization medium and the reactants) is less than 0.5 wt-%, in particular less than 2000 ppm by weight (shown by analysis). Thus, when the prepolymerized catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 70° C., preferably 35 to 65° C.

All of the Ziegler-Natta catalyst (ZN-C) is fed in the pre-polymerization reactor. Subsequently the pre-polymerization product containing the modified Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 67 to 75° C., e.g. 70° C.; and
(b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Still more preferably the operating temperature of the third polymerization reactor (R3)—if present—is higher than the operating temperature in the first polymerization reactor (R1). In one specific embodiment the operating temperature of the third polymerization reactor (R3)—if present—is higher than the operating temperature in the first polymerization reactor (R1) and in the second polymerization reactor (R2). Accordingly it is preferred that the operating temperature
(a) in the first polymerization reactor (R1) is in the range of 62 to 85° C., more preferably in the range of 65 to 82° C., still more preferably in the range of 67 to 80° C., like 67 to 75° C., e.g. 70° C.;
(b) in the second polymerization reactor (R2) is in the range of 75 to 95° C., more preferably in the range of 78 to 92° C., still more preferably in the range of 78 to 88° C., and
(c) in the third polymerization reactor (R3)—if present—is in the range of 75 to 95° C., more preferably in the range of 78 to 92° C., still more preferably in the range of 85 to 92° C., like in the range of 87 to 92° C., with the proviso that the operating temperature in the in the second polymerization reactor (R2) is equal or higher to the operating temperature in the first polymerization reactor (R1) and with the proviso that the third polymerization reactor (R3) is higher than the operating temperature in the first polymerization reactor (R1), preferably is higher than the operating temperature in the first polymerization reactor (R1) and in the second polymerization reactor (R2).

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range of from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 20 min, more preferably in the range of 20 to 80 min, still more preferably in the range of 25 to 60 min, like in the range of 28 to 50 min, and/or the average residence time ($\tau$) in the second polymerization reactor (R2) is preferably at least 90 min, more preferably in the range of 90 to 220 min, still more preferably in the range of 100 to 210 min, yet more preferably in the range of 105 to 200 min, like in the range of 105 to 190 min. Preferably the average residence time ($\tau$) in the third polymerization reactor (R3)—if present—is preferably at least 30 min, more preferably in the range of 30 to 120 min, still more preferably in the range of 40 to 100 min, like in the range of 50 to 90 min.

Further it is preferred that the average residence time ($\tau$) in the total sequential polymerization system, more preferably that the average residence time ($\tau$) in the first (R1) second polymerization reactors (R2) and optional third polymerization reactor (R3) together, is at least 140 min, more preferably at least 160 min, still more preferably in the range of 140 to 260 min, more preferably in the range of 160 to 240 min, still more preferably in the range of 160 to 220 min, yet more preferably in the range of 160 to 220 min.

As mentioned above the instant process comprises in addition to the (main) polymerization of the propylene-ethylene copolymer in the at least two polymerization reactors (R1, R2 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the modified Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1).

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the modified Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, subsequent to said pre-polymerization, the mixture (MI) of the modified Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

Accordingly the process according the instant invention comprises the following steps under the conditions set out above
(a) in the first polymerization reactor (R1), i.e. in a loop reactor (LR), propylene and ethylene are polymerized obtaining a first propylene copolymer fraction (PP-COPO-1) of the propylene-ethylene copolymer,
(b) transferring said first propylene copolymer fraction (PP-COPO-1) to a second polymerization reactor (R2),
(c) in the second polymerization reactor (R2) propylene and ethylene are polymerized in the presence of the first propylene copolymer fraction (PP-COPO-1) obtaining a second propylene copolymer fraction (PP-COPO-2) of the propylene-ethylene copolymer, said first propylene copolymer fraction (PP-COPO-1) and said second propylene copolymer fraction (PP-COPO-2) form the propylene-ethylene copolymer.

A pre-polymerization as described above is accomplished prior to step (a).

The Ziegler-Natta Catalyst (ZN-C), the External Donor (ED) and the Co-Catalyst (Co)

As pointed out above in the specific process for the preparation of the propylene-ethylene copolymer as defined above a Ziegler-Natta catalyst (ZN-C) is preferably used. Accordingly the Ziegler-Natta catalyst (ZN-C) will be now described in more detail.

The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds.

Further, the solid catalyst is free of any external support material, like silica or MgCl2, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of
a)
a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
a4) providing a solution of Group 2 alkoxide of formula $M(OR1)_n(OR2)_mX_{2-n-m}$ or mixture of Group 2 alkoxides $M(OR1)_{n'}X_{2-n'}$ and $M(OR2)_{m'}X_{2-m'}$, where M is Group 2 metal, X is halogen, R1 and R2 are different alkyl groups of C2 to C16 carbon atoms, and $0<n<2$, $0<m<2$ and $n+m+(2-n-m)=2$, provided that both n and $m\neq 0$, $0<n'<2$ and $0<m'<2$; and
b) adding said solution from step a) to at least one compound of a transition metal of Group 4 to 6 and
c) obtaining the solid catalyst component particles,
and adding an internal electron donor, preferably a non-phthalic internal donor, at any step prior to step c).

The internal donor or precursor thereof is added preferably to the solution of step a).

Detailed description as to how such a Ziegler-Natta catalyst (ZN-C) can be obtained is disclosed in WO 2012/007430.

According to the procedure above the Ziegler-Natta catalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same. In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycolmonobutyl ether, 3-butoxy-2-propanol, with 2-(2-ethylhexyloxy)ethanol and 1,3-propyleneglycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane.

Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of monounsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon 20 atoms, like polyoctene, polynonene, polydecene, polyundecene or polydodecene or mixtures thereof. Most preferable it is polydecene.

Solidification of the dispersed phase droplets by heating is suitably carried out at a temperature of 70 to 150° C., usually at 80 to 110° C., preferably at 90 to 110° C. The heating may be done faster or slower. As especial slow heating is understood here heating with a heating rate of about 5° C./min or less, and especial fast heating e.g. 10° C./min or more. Often slower heating rates are preferable for obtaining good morphology of the catalyst component.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m².

Typically the amount of Ti is 1 to 6 wt %, Mg 10 to 20 wt % and donor 10 to 40 wt % of the catalyst composition.

Detailed description of preparation of catalysts is disclosed in WO 2012/007430, EP 2610271, EP 261027 and EP2610272 which are incorporated here by reference.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

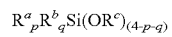

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3.

$R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH3)$_2$ and (cyclopentyl)$_2$ Si(OCH$_3$)$_2$, or of general formula

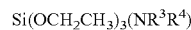

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminium halide or aluminum alkyl halide compound. Accordingly, in one specific embodiment the cocatalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst used for the preparation of the propylene-ethylene copolymers of the present invention is modified by the BNT-technology in the prepolymerization step.

The optional further additives, like antioxidants, as well as slip agents and antiblocking agents are added to the propylene-ethylene copolymers, which are collected from the final reactor of the series of reactors.

Preferably, these additives are mixed into the copolymers prior to or during the extrusion process in a one-step compounding process.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. Preferably, the final polymer (i.e. propylene-ethylene copolymer and additives including the two alpha nucleating agents) will be prepared by blending the additives together with the propylene-ethylene copolymer derived from the final reactor at a temperature, which is sufficiently high to soften and plasticize the polymer. The temperatures and pressures used in the operation of the extruder are known in the art.

Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

The present invention is also directed to injection moulded articles comprising at least 70 wt %, more preferably at least 90 wt %, yet more preferably at least 95 wt %, still more preferably consisting of, a propylene-ethylene copolymer as defined above.

Further present invention is also directed to the use of the propylene-ethylene copolymers according to the present invention in the production of moulded articles, particularly injection moulded articles, such as thin-walled plastic containers for packaging.

Thin-walled plastic containers for packaging produced by injection moulding, comprising at least 70 wt %, more preferably at least 90 wt %, yet more preferably at least 95 wt %, still more preferably consisting of, a propylene-ethylene copolymer as defined above.

The thin-walled plastic containers for packaging preferably have a thickness of equal or below 2 mm, preferably in the range of 0.2 to 2.0 mm. Said thin-walled plastic containers for packaging are preferably produced by injection moulding.

Further the thin-walled plastic containers for packaging are preferably selected from the group consisting of cups, boxes, trays, pails, buckets, bowls, lids, flaps, caps, CD covers, DVD covers and the like.

Moulded articles, especially injection moulded articles prepared form the propylene-ethylene random copolymers of the present invention are characterized by a high tensile modulus (measured according to ISO 527) measured after 96 hours of storage at +23±1° C. and 50% relative humidity (=standard conditions) and even higher high tensile modulus (measured according to ISO 527) measured after 1440 hours of storage at +23±1° C. and 50% relative humidity (=standard conditions).

Thus the articles have a tensile modulus (measured according to ISO 527) measured after 96 hours of storage under standard conditions of at least 1000 MPa, preferably of at least 1050 MPa; and measured after 1440 hours of storage under standard conditions of at least 1100 MPa, preferably of at least 1150 MPa.

Simultaneously the puncture energy (measured according to ISO 6603-2; 60×60×2 mm³ specimens) is at a high level measured after 96 hours of storage at +23±1° C. and 50% relative humidity (=standard conditions) and stays approximately on that level when measured after 1440 hours of storage at +23±1° C. and 50% relative humidity (=standard conditions).

Thus the articles have a puncture energy (measured according to ISO 6603-2; 60×60×2 mm³ specimens) measured after 96 hours of storage under standard conditions of at least 23 J, preferably at least 25 J and measured after 1440 hours of storage under standard conditions again of at least 19 J, preferably at least 21 J.

EXPERIMENTAL PART

A) Measuring Methods

The following definitions of terms and determination methods apply for the above general description of the invention as well as to the below examples unless otherwise defined.

Calculation of comonomer content of the second propylene copolymer fraction (PP-COPO-2):

$$\frac{C(PP) - w(PP1) \times C(PP1)}{w(PP2)} = C(PP2) \quad (I)$$

wherein
w(PP1) is the weight fraction [in wt %] of the first propylene copolymer fraction (PP-COPO-1),
w(PP2) is the weight fraction [in wt %] of second propylene copolymer fraction (PP-COPO-2,
C(PP1) is the comonomer content [in mol %] of the first propylene copolymer fraction (PP-COPO-1),
C(PP) is the comonomer content [in mol %] of the propylene-ethylene copolymer,
C(PP2) is the calculated comonomer content [in mol %] of the second propylene copolymer fraction (PP-COPO-2).

Calculation of melt flow rate $MFR_2$ (230° C.) of the second propylene copolymer fraction (PP-COPO-2):

$$MFR(PP2) = 10^{\left[\frac{\log(MFR(PP))-w(PP1)\times\log(MFR(PP1))}{w(PP2)}\right]} \quad (III)$$

wherein
w(PP1) is the weight fraction [in wt %] of the first propylene copolymer fraction (PP-COPO-1),
w(PP2) is the weight fraction [in wt %] of second propylene copolymer fraction (PP-COPO-2),
MFR(PP1) is the melt flow rate $MFR_2$ (230° C.) [in g/10 min] of the first propylene copolymer fraction (PP-COPO-1),
MFR(PP) is the melt flow rate $MFR_2$ (230° C.) [in g/10 min] of the propylene-ethylene copolymer,
MFR(PP2) is the calculated melt flow rate $MFR_2$ (230° C.) [in g/10 min] of the second propylene copolymer fraction (PP2-COPO-2).

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[\text{mol \%}] = 100 * fE$$

The weight percent comonomer incorporation was calculated from the mole fraction:

$$E[\text{wt \%}] = 100*(fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \qquad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample The xylene solubles (XCS, wt %): Content of xylene cold solubles (XCS) is determined at 25° C. according ISO 16152; first edition; 2005 Jul. 1

ICP Analysis (Al, Mg, Ti)

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly de-ionized (DI) water (5% of V). The solution was further diluted with DI water up to the final volume, V, and left to stabilize for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% $HNO_3$ in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

The amount of residual VCH in the catalyst/oil mixture was analysed with a gas chromatograph. Toluene was used as internal standard.

Tensile test: The tensile modulus was measured at 23° C. according to ISO 527-1 (cross head speed 1 mm/min) using injection moulded specimens moulded at 180° C. or 200° C. according to ISO 527-2(1B), produced according to EN ISO 1873-2 (dog 10 bone shape, 4 mm thickness).

The tensile modulus for the examples was measured after 96 h and 1440 hours of storage.

Puncture energy was determined in the instrumental falling weight (IFW) test according to ISO 6603-2 using injection moulded plaques of 60×60×2 mm and a test speed of 2.2 m/s. Puncture energy reported results from an integral of the failure energy curve measured at +23° C.

The puncture energy for the examples was measured after 96 h and 1440 hours of storage Wide-Angle X-Ray Scattering (WAXS)

Samples prepared for WAXS were prepared in the same way as for the puncture energy measurement.

The determination of crystallinity and of polymorphic composition was performed in reflection geometry using a Bruker D8 Discover with GADDS x-ray diffractometer operating with the following settings: x-ray generator: 30 kV and 20 mA; $\theta_1$=6° & $\theta_2$=13°; sample-detector distance: 20 cm; beam size (collimator): 500 µm; and duration/scan: 300 seconds. 3 measurements have been performed on each sample. Intensity vs. 2θ curves between 2θ=10° and 2θ=32.5° were obtained by integrating the 2-dimensional spectra. The quantification of intensity vs. 2θ curves were then performed as follows:

Intensity vs. 2θ curve was acquired with the same measurement settings on an amorphous iPP sample, which was prepared by solvent extraction. An amorphous halo was obtained by smoothing the intensity vs. 2θ curve. The amorphous halo has been subtracted from each intensity vs. 2θ curve obtained on actual samples and this results in the crystalline curve.

The crystallinity index $X_c$ is defined with the area under the crystalline curve and the original curve using the method proposed by Challa et al. (*Makromol. Chem.* vol. 56 (1962), pages 169-178) as:

$$X_c = \frac{\text{Area under crystalline curve}}{\text{Area under original spectrum}} \times 100.$$

In a two-phase crystalline system (containing α- and β-modifications), the amount of β-modification within the crystalline phase B was calculated using the method proposed by Turner-Jones et al. (*Makromol. Chem.* Vol. 75 (1964), pages 134-158) as:

$$B = \frac{I^\beta(300)}{I^\alpha(110) + I^\alpha(040) + I^\alpha(130) + I^\beta(300)},$$

where, $I^\beta(300)$ is the intensity of β(300) peak, $I^\alpha(110)$ is the intensity of α(110) peak, $I^\alpha(040)$ is the intensity of α(040) peak and $I^\alpha(130)$ is the intensity of α(130) peak obtained after subtracting the amorphous halo.

In a two-phase crystalline system (containing α- and γ-modifications), the amount of γ-modification within the crystalline phase G (i.e. Kγ) was calculated using the method developed by Pae (*J. Polym. Sci., Part A*2, vol. 6 (1968), pages 657-663) as:

$$G = \frac{I^\gamma(117)}{I^\alpha(130) + I^\gamma(117)},$$

where, $I^\alpha(130)$ is the intensity of α(130) peak and $I^\gamma(117)$ is the intensity of γ(117) peak obtained after subtracting a base line joining the base of these peaks.

B) Examples

Inventive Examples IE1 and IE2

Used Chemicals:
20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Complex First a magnesium alkoxide solution was prepared by adding, with stirring (70 rpm), into 1 1 kg of a 20 wt-% solution in toluene of butyl ethyl magnesium (Mg(Bu)(Et), BEM), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm)

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg complex prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away.

Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

VCH Modification of the Catalyst 41 liters of mineral oil (Paraffinum Liquidum PL68) were added to the prepolymerization reactor of a Borstar pilot plant followed by 1.79 kg of triethyl aluminium (TEAL) and 0.79 kg of dicyclopentyl dimethoxy silane (donor D) under inert conditions at room temperature. Afterwards 5.5 kg of the catalyst prepared as described above for the inventive Examples was added, followed by 5.55 kg of vinylcyclohexane (VCH).

Comparative Example 1 (CE1)

The catalyst used in the polymerization processes of the comparative example (CE1) was the catalyst of the example section of WO 2010009827 A1 (see pages 30 and 31) along with triethyl-aluminium (TEAL) as co-catalyst and dicyclopentyl dimethoxysilane (D-donor) as donor.

This catalyst was not modified with VCH.

The polymerization was done in a Borstar pilot plant with a prepolymerization reactor, a loop reactor and a gas phase reactor (1$^{st}$ GPR) for IE1; IE2 and CE1

The polymerization conditions are indicated in table 1.

TABLE 1

Preparation of the Examples

| | | IE1 | IE2 | CE1 |
|---|---|---|---|---|
| Prepolymerization | | | | |
| Temperature (° C.) | [° C.] | 32 | 32 | 30 |
| Ethylene feed | [kg/h] | 0.23 | 0.21 | 0.40 |
| Residence time | [h] | 0.36 | 0.36 | 0.34 |
| Donor | [—] | D | D | D |
| Donor feed | [g/tC3] | 51.9 | 51.4 | 42.0 |
| Cocatalyst feed | [g/tC3] | 180 | 180. | 120 |
| Loop (PP-COPO-1) | | | | |
| Temperature | [° C.] | 70 | 70 | 80 |
| Residence time | [h] | 0.42 | 0.42 | 0.25 |
| C2/C3 | [mol/kmol] | 11.0 | 9.65 | 13.5 |
| H2/C3 | [mol/kmol] | 3.4 | 3.1 | 2.8 |
| MFR | [g/10 min] | 111.1 | 85.8 | 70 |
| C2 | [mol %] | 1.4 | 1.3 | 1.4 |
| XCS | [wt %] | 4.6 | 4.2 | 4.0 |
| split | [%] | 51 | 46 | 46 |
| 1st GPR/(PP-COPO-2) | | | | |
| Temperature | [° C.] | 80 | 80 | 90 |
| Residence time | [h] | 2.0 | 2.1 | 1.2 |
| C2/C3 | [mol/kmol] | 40.4 | 36.0 | 46.5 |
| H2/C3 | [mol/kmol] | 141.0 | 143.0 | 150.0 |
| MFR | [g/10 min] | 91.0 | 76.4 | 70 |
| C2 | [mol %] | 4.2 | 4.0 | 4.0 |
| XCS | [wt %] | n.d. | 9.1 | 6.0 |
| split | [%] | 49 | 54 | 54 | n.d. not determined

All polymer powders were compounded in a co-rotating twin-screw extruder Coperion ZSK 57 at 220° C. with 0.2 wt % of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.05 wt % calcium stearate and the below described nucleating agents.

The material of the comparative example CE1 was nucleated with 0.2 wt % of the sorbitol M3988, commercially available from Millad, based on the total weight of the propylene-ethylene copolymer.

The properties of the nucleated copolymers are shown in Table 2:

TABLE 2 properties of nucleated copolymers

| Example | | IE1 | IE2 | CE1 |
|---|---|---|---|---|
| MFR2 (230° C., 2.16 kg) | [g/10 min] | 91 | 71 | 68 |
| C2 total (NMR) | [mol %] | 6.2 | 6.5 | 5.6 |
| 100.Kγ/WAXS | [%] | 35 | 37 | 52 |
| Tensile modulus after 96 h | [MPa] | 1063 | 1080 | 1121 |
| Tensile modulus after 1440 h | [MPa] | 1157 | 1175 | 1215 |
| Puncture energy after 96 h | [J] | 27.8 | 27.2 | 25.5 |
| Puncture energy after 1440 h | [J] | 22.2 | 21.8 | 17.2 |
| n-PEP[1)] | [%] | 65 | 62 | 73 |
| EEE | [mol %] | 0.91 | 0.83 | 0.67 |
| PEE | [mol %] | 1.38 | 1.66 | 1.01 |
| PEP | [mol %] | 4.31 | 4.08 | 4.73 |
| PPP | [mol %] | 86.34 | 84.90 | 86.96 |

TABLE 2-continued

| properties of nucleated copolymers | | | | |
|---|---|---|---|---|
| Example | | IE1 | IE2 | CE1 |
| EPP | [mol %] | 8.20 | 8.84 | 7.90 |
| EPE | [mol %] | 0.25 | 0.31 | 0.05 |

$$^{1)}I(E) = \frac{fPEP}{(fEEE + fPEE + fPEP)} \times 100 \text{(I)}$$

From Figure 1 it can be seen that the polymers of IE1 and IE2 (in-reactor nucleated) have a clearly slower trend of puncture energy decrease than the polymer of the comparative example CE1 (post-reactor nucleated.

The invention claimed is:

1. A propylene-ethylene random copolymer having:
   (i) a melt flow rate $MFR_2$ (according to ISO 1133, 230° C., 2.16 kg) in the range of 50 to 120 g/10 min,
   (ii) a total ethylene comonomer content of 3.0 to 9.0 mol %
   (iii) a content of an orthorhombic gamma-crystal phase 100.Kγ of less than 45% as determined by wide-angle X-ray diffraction (WAXS) on a 60×60×2 mm³ injection moulded test specimen and comprising:
   0.0001 to 1.0 wt %, based on the total weight of the propylene-ethylene random copolymer, of a polymeric α-nucleating agent (pNA).

2. The propylene-ethylene random copolymer according to claim 1, comprising two propylene copolymer fractions:
   a) a first propylene copolymer fraction (PP-COPO-1) having an ethylene comonomer content of at most 3.5 mol %, and
   b) a second propylene copolymer fraction (PP-COPO-2), said first propylene copolymer fraction (PP-COPO-1) having a higher $MFR_2$ and/or a lower ethylene comonomer content than said second propylene copolymer fraction (PP-COPO-2).

3. The propylene-ethylene copolymer according to claim 2, wherein the first propylene copolymer fraction (PP-COPO-1) has an ethylene comonomer content of at least 1.0 mol % and at most 3.5 mol % and the second propylene copolymer fraction (PP-COPO-2) has an ethylene comonomer content in the range of 2.0 mol % to at most 11.0 mol %, whereby the first propylene copolymer fraction (PP-COPO-1) has an ethylene comonomer content below that of the second propylene copolymer fraction (PP-COPO-2).

4. The propylene-ethylene copolymer according to claim 2, wherein the first propylene copolymer fraction (PP-COPO-1) has a melt flow rate $MFR_2$ (230° C.) in the range of 50.0 to 150 g/10 min and the second propylene copolymer fraction (PP-COPO-2) has a melt flow rate $MFR_2$ (230° C.) in the range of 40.0 to 120 g/10 min, whereby the $MFR_2$ of the second propylene copolymer fraction (PP-COPO-2) is lower than the $MFR_2$ of the first propylene copolymer fraction (PP-COPO-1).

5. The propylene-ethylene copolymer according to claim 2, wherein the second propylene copolymer fraction (PP-COPO-2) has an ethylene comonomer content which is higher than the ethylene comonomer content of the first propylene copolymer fraction (PP-COPO-1) and has an $MFR_2$ which is lower than the $MFR_2$ of the first propylene copolymer fraction (PP-COPO-1).

6. The propylene-ethylene copolymer according to claim 1, wherein the polymeric α-nucleating agent is a polymerized vinyl compound of formula (I):

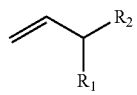

wherein $R_1$ and $R_2$ together form a 5 or 6 membered saturated or unsaturated or aromatic ring or they stand independently for a lower alkyl comprising 1 to 4 carbon atoms.

7. The propylene-ethylene copolymer according to claim 6, whereby the polymerized vinyl compound is selected from the group consisting of vinyl cycloalkanes.

8. The propylene-ethylene copolymer according to claim 1, wherein the propylene-ethylene copolymers is prepared in the presence of:
   a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
   b) optionally a co-catalyst (Co), and
   c) optionally an external donor (ED).

9. The propylene-ethylene copolymer according to claim 8, wherein:
   a) the internal donor (ID) is selected from optionally substituted malonates, maleates, succinates, glutarates, cyclohexene-1,2-dicarboxylates, benzoates and derivatives or mixtures thereof; and
   b) a molar-ratio of co-catalyst (Co) to external donor (ED) [Co/ED] is 5 to 45.

10. The propylene-ethylene copolymer according to claim 1, wherein the propylene-ethylene copolymer is produced in a sequential polymerization process, comprising a prepolymerization reactor (PPR) and at least one reactor (R1) or at least two reactors (R1) and (R2), whereby in the prepolymerization reactor a vinyl compound is first polymerized with a catalyst system, comprising a Ziegler-Natta catalyst component, a cocatalyst and optional external donor, a reaction mixture of a polymer of the vinyl compound and the catalyst system is then introduced in a first polymerization reactor (R1), whereby in the first polymerization reactor (R1) a first propylene copolymer fraction (PP-COPO-1) is produced and subsequently transferred into a second polymerization reactor (R2), in the second polymerization reactor (R2) a second propylene copolymer fraction (PP-COPO-2) is produced in the presence of the first propylene copolymer fraction (PP-COPO-1).

11. A molded article, comprising a propylene-ethylene copolymer according to claim 1.

12. A thin wall packaging made by injection molding, comprising a propylene-ethylene copolymer according to claim 1.

13. A molded article according to claim 11, having:
   a tensile modulus (measured according to ISO 527) measured after 96 hours of storage at +23±1° C. and 50% relative humidity (standard conditions) of at least 1050 MPa and tensile modulus (measured according to ISO 527) measured after 1440 hours of storage under standard conditions of at least 1100 MPa and
   simultaneously having a puncture energy (measured according to ISO 6603-2; 60×60×2 mm³ specimens) measured after 96 hours of storage under standard conditions of at least 23 J, and measured after 1440 hours of storage under standard conditions of at least 19 J.

* * * * *